(12) United States Patent
Lee et al.

(10) Patent No.: US 8,441,367 B1
(45) Date of Patent: May 14, 2013

(54) SYSTEM AND METHOD OF ALERTING USERS BASED ON PROXIMITY

(75) Inventors: Steven Lee, San Francisco, CA (US); Chris Lambert, San Francisco, CA (US); Rohan Seth, San Francisco, CA (US); Michael Chu, Los Altos, CA (US); Yuhua Luo, San Jose, CA (US)

(73) Assignee: Google Inc., Mountain View, CA (US)

( * ) Notice: Subject to any disclaimer, the term of this patent is extended or adjusted under 35 U.S.C. 154(b) by 373 days.

(21) Appl. No.: 12/943,340

(22) Filed: Nov. 10, 2010

Related U.S. Application Data

(60) Provisional application No. 61/259,926, filed on Nov. 10, 2009.

(51) Int. Cl.
*G08B 21/00* (2006.01)

(52) U.S. Cl.
USPC ............... 340/686.6; 340/539.13; 342/450

(58) Field of Classification Search ............ 340/686.6, 340/539.11, 539.13; 342/450, 457; 701/410, 701/491
See application file for complete search history.

(56) References Cited

U.S. PATENT DOCUMENTS

| | | | |
|---|---|---|---|
| 2008/0048914 A1 * | 2/2008 | Smith et al. | 342/450 |
| 2008/0316022 A1 * | 12/2008 | Buck et al. | 340/539.13 |
| 2010/0069035 A1 * | 3/2010 | Johnson | 455/404.1 |

* cited by examiner

*Primary Examiner* — John A Tweel, Jr.
(74) *Attorney, Agent, or Firm* — Lerner, David, Littenberg, Krumholz & Mentlik, LLP

(57) ABSTRACT

An alert server is operative to notify users when they are in proximity within one another. The alert server may determine to alert a first user of the proximity of a second user when the second user is in an unusual location. The alert server may determine that the second user is in an unusual location when the second user is outside his or her routine geographic location. The alert server may determine whether the second user is outside his or her routine geographic location by assigning confidence values to geographic locations that the second user has previously visited. The alert sent to the first user may be in the form of a text message, e-mail, or other electronic communication. The first user may receive the alert on a mobile device, such as a cellphone, smartphone, netbook, or other mobile device.

20 Claims, 5 Drawing Sheets

SYSTEM AND METHOD OF ALERTING USERS BASED ON PROXIMITY

CROSS-REFERENCE TO RELATED APPLICATIONS

This application claims the benefit of priority to U.S. Provisional Application Ser. No. 61/259,926, titled "SYSTEM AND METHOD OF ALERTING USERS BASED ON PROXIMITY" and filed Nov. 10, 2009, which is incorporated by reference in its entirety.

BACKGROUND

As a person's life has become busier and busier, it is difficult to notify his/her friends of where s/he is at any given time. As work and other demands often keep a person on the move, a person may find it hard to stay in constant communication with other people. Furthermore, depending on how often a person finds himself or herself traveling, this person may want to let friends or loved ones know where s/he is, but this person may not have time to call all of their loved ones or friends. Finally, with the advent of social networks and instant communications, a person may want to communicate to their friends when this person has moved outside of this person's "comfort zone" or has changed his/her routine.

However, there are several challenges in providing automatic alerts to friends or loved ones. One challenge in providing these alerts is avoiding a constant stream of alerts or sending alerts that are relatively insignificant. This challenge is difficult because, in today's mobile society, a person can visit a geographic location multiple times throughout the day and these visits may or may not be significant. Moreover, if a friend has received an alert about the location of the traveling friend already, it may be difficult to determine when a follow-up alert would be desirable.

BRIEF SUMMARY

An apparatus for alerting one or more users to the proximity of an unusually located user is provided. In one embodiment, the apparatus includes a memory operative to store a geographic location history for a first user, the geographic location history comprising a plurality of geographic locations, wherein each geographic location is associated with at least one time segment.

The apparatus may also include a processor in communication with the memory, the processor being operative to determine a confidence value for each of the geographic locations of the plurality of geographic locations stored in the memory, wherein each confidence value for each of the geographic locations represents the likelihood of the first user being at the corresponding geographic location. The processor may also receive a current geographic location of the first user and retrieve a corresponding confidence value for the received current geographic location of the first user. In addition, the processor may determine that the current geographic location of the user is unusual based on the comparison of the retrieved corresponding confidence value with a threshold confidence value, and the processor may transmit an alert to a second user in proximity to the first user when the processor determines that the current geographic location of the first user is unusual.

In one embodiment of the apparatus, each of the geographic locations of the plurality of geographic locations were geographic locations in which the first user was relatively stationary.

In another embodiment of the apparatus, at least one of the geographic locations of the plurality of geographic locations is a geographic location where the first user spent a predetermined amount of time being relatively stationary.

In a further embodiment of the apparatus, the memory is further operative to organize the geographic location history according to at least one time-keyed table and at least one region-keyed table, and the processor is further operative to retrieve the corresponding confidence value with reference to the at least one time-keyed table or the at least one region-keyed table.

In yet another embodiment of the apparatus, the processor is further operative to distribute a selected one of the determined confidence values among a subset of the plurality of geographic locations when the processor determines that it is likely that the first user was at any one of the geographic locations of the subset of geographic locations.

In yet a further embodiment of the apparatus, the processor is further operative to determine that the current geographic location of the user is unusual when the retrieved corresponding confidence value is less than the threshold confidence value.

In another embodiment of the apparatus, the processor is operative to determine a selected one of the confidence values based on whether the corresponding geographic location of the selected one of the confidence values was determined according to one of two transmission modes. In addition, the selected one of the confidence values is determined to be of a lesser value when the corresponding geographic location was determined based on the first transmission mode than where the corresponding geographic location was determined based on the second transmission mode.

In a further embodiment of the apparatus, the processor is further operative to determine that the first user is in proximity to the second user when the distance between the first user and the second user is less than a pre-defined threshold distance.

In yet another embodiment of the apparatus, the processor is further operative to decrease the pre-defined threshold distance when the alert is transmitted to the second user, and the processor may transmit another alert to the second user when proximity between the first user and the second user is less than the decreased pre-defined threshold distance.

In yet a further embodiment of the apparatus, the type of alert transmitted to the second user is based on how a geographic location of the second user is determined.

A method for alerting one or more users to the proximity of an unusually located user is also provided. The method may include storing, in a memory, a geographic location history for a first user, the geographic location history comprising a plurality of geographic locations, wherein each geographic location is associated with at least one time segment. The method also includes determining, with a processor in communication with the memory, a confidence value for each of the geographic locations of the plurality of geographic locations stored in the memory, wherein each confidence value for each of the geographic locations represents the likelihood of the first user being at the corresponding geographic location.

In addition, the method may include receiving a current geographic location of the first user and retrieving a corresponding confidence value for the received current geographic location of the first user. The method may further include determining that the current geographic location of the user is unusual based on the comparison of the retrieved corresponding confidence value with a threshold confidence value and transmitting an alert to a second user in proximity to the first user when the processor determines that the current geographic location of the first user is unusual.

In one embodiment of the method, each of the geographic locations of the plurality of geographic locations were geographic locations in which the first user was relatively stationary.

In another embodiment of the method, at least one of the geographic locations of the plurality of geographic locations is a geographic location where the first user spent a predetermined amount of time being relatively stationary.

In a further embodiment of the method, the method may further include organizing the geographic location history according to at least one time-keyed table and at least one region-keyed table and retrieving the corresponding confidence value with reference to the at least one time-keyed table or the at least one region-keyed table.

In yet another embodiment of the method, the method may further include distributing a selected one of the determined confidence values among a subset of the plurality of geographic locations when the processor determines that it is likely that the first user was at any one of the geographic locations of the subset of geographic locations.

In yet a further embodiment of the method, the method may further include determining that the current geographic location of the user is unusual when the retrieved corresponding confidence value is less than the threshold confidence value.

In another embodiment of the method, the method may further include determining a selected one of the confidence values based on whether the corresponding geographic location of the selected one of the confidence values was determined according to one of two transmission modes. The method may also include that the selected one of the confidence values is determined to be of a lesser value when the corresponding geographic location of the selected confidence value was determined based on the first transmission mode than where the corresponding geographic location of the selected confidence value was determined based on the second transmission mode.

In a further embodiment of the method, the method may further include determining that the first user is in proximity to the second user when the distance between the first user and the second user is less than a pre-defined threshold distance.

In yet another embodiment of the method, the method may further include decreasing the pre-defined threshold distance when the alert is transmitted to the second user, and transmitting another alert to the second user when proximity between the first user and the second user is less than the decreased pre-defined threshold distance.

In yet a further embodiment of the method, the type of alert transmitted to the second user is based on how a geographic location of the second user is determined.

DETAILED DESCRIPTION

Figure 1:
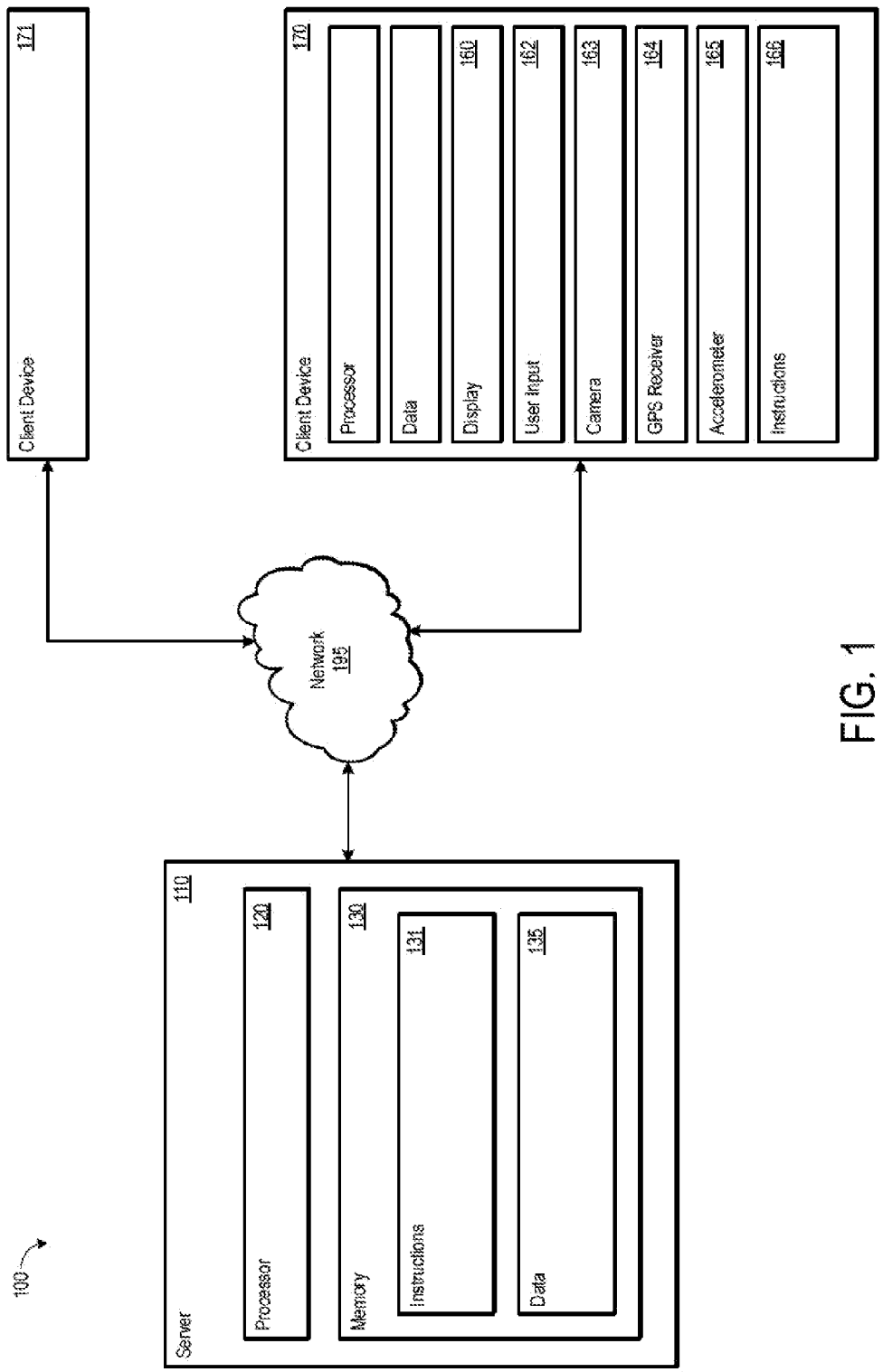
FIG. 1 is an illustration of one example of an alert server in communication with multiple client devices in accordance with aspects of the invention.
Figure 2:
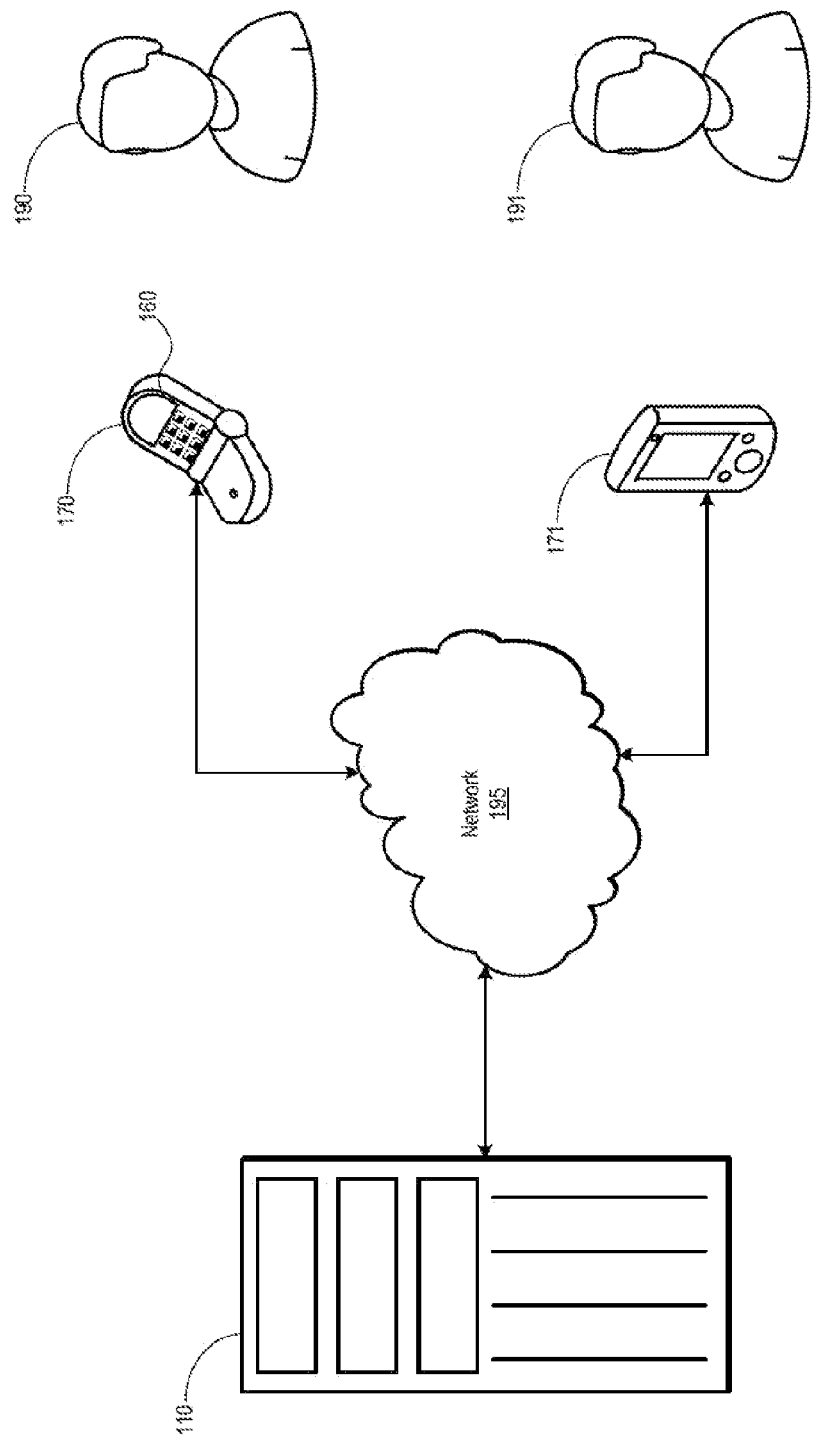
FIG. 2 is an illustration of another example of the alert server in communication with the multiple client devices in accordance with aspects of the invention.

As shown in FIGS. 1-2, a system 100 in accordance with one embodiment includes an alert server 110 in communication with multiple client devices 170-171. The alert server 110 may include a processor 120, memory 130 and other components typically present in general purpose computers.

Memory 130 may store information that is accessible by the processor 120, including instructions 131 that may be executed by the processor 120 and data 135. The memory may be of any type of memory operative to store information accessible by the processor, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or AMD. Alternatively, the processor may be a dedicated controller such as an application-specific integrated circuit ("ASIC").

Although FIG. 1 functionally illustrates the processor and memory as being within the same block, it will be understood by those of ordinary skill in the art that the processor 120 and memory 130 may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and operative of directly and indirectly communicating with other nodes of the network. For example, the computer 110 may comprise a web server that is operative to communicate with client devices 170-71 via the network 195 such that the alert server 110 uses the network 195 to transmit and display information to the user 190 on a display 160 of the client device 170. The alert server 110 may also comprise a plurality of computers that exchange information with different nodes of a network for the purpose of receiving, processing and transmitting data to the client devices; in this instance, the client devices 170-171 may be at different nodes of the network than any of the computers comprising the alert server 110.

The network 195, and the intervening nodes between the alert server 110 and the client devices 170-171, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, hypertext transfer protocol ("HTTP") and simple mail transfer protocol ("SMTP"), and various combinations of the foregoing. Although only a few devices are depicted in FIGS. 1-2, it should be appreciated that a typical system may include a large number of connected computers.

Each client device 170-171 may be configured similarly to the alert server 110, with a processor, memory and instructions. Each client device 170-171 may be a mobile phone operative to wirelessly exchanging data with a server over a network such as the Internet and intended for use by a person 190-191. It may have all of the components normally used in connection with a wireless mobile device such as a central processing unit (CPU), memory (e.g., RAM and ROM) storing data and instructions, an electronic display 160 (e.g., a liquid crystal display ("LCD") screen or touch-screen), user input 162 (e.g., a keyboard, touch-screen or microphone), camera 163, a speaker, a network interface component, and all of the components used for connecting these elements to one another. Some or all of these components may all be internally stored within the same housing, e.g. a housing defined by a plastic shell and LCD screen.

The client devices 170-171 may also include a geographic position component 164, such as circuits, to determine the geographic location and orientation of the device. For example, client device 170 may include a Global Positioning System ("GPS") receiver 164 that may determine the latitude, longitude and altitude of the client device 170. The component may also comprise software operative to determine the position of the device based on other signals received at the client device 170, such as signals received from one or more cell phone towers where the client device 170 includes a cell phone.

The client device 170 may also include an accelerometer 165 and/or gyroscope to determine the direction in which the device is oriented. By way of example only, the client device 170 may determine its pitch, yaw or roll (or changes thereto) relative to the direction of gravity or a plane perpendicular thereto. In that regard, it will be understood that a client device's provision of location and orientation data as set forth herein may be provided automatically to the user 190, to the alert server 110, or both.

Although the client devices 170-171 may comprise a mobile phone, the client device may also comprise a personal computer or personal display assistant ("PDA"). In that regard, the display 160 may also comprise a monitor having a screen, a projector, a television, a computer printer or any other electrical device that is operable to display information. The user input 162 may also include other components such as a mouse. Indeed, devices in accordance with the systems and methods described herein may comprise any device operative to process instructions and transmit data to and from humans and other computers including general purpose computers, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Yet further, although some functions are indicated as taking place on the alert server 110 and others on the client devices 170-171, various aspects of the system and method may be implemented by a single computer having a single processor.

The alert server 110 may also store map-related information, at least a portion of which may be transmitted to the client devices 170-171. For example, the alert server 110 may store map tiles, where each tile is a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom.

The map information is not limited to any particular format. For example, the images may comprise street maps, satellite images, or a combination of these, and may be stored as vectors (particularly with respect to street maps) or bitmaps (particularly with respect to satellite images).

The various map tiles are each associated with geographical locations, such that the alert server 110 is operative to select, retrieve and transmit one or more tiles in response to receiving a geographical location.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is operative to identify a geographic locations (e.g., lot and block numbers on survey maps). Moreover, a location may define a range of the foregoing.

The system and method may further translate locations from one reference system to another. For example, the alert server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

The alert server 110 and other devices may store additional data as described below. The alert server 110 may receive updates of the location of a user as the user travels from geographic location to geographic location. By way of example, the user may enable his or her mobile device 170 to transmit its location to the server. This may occur, for instance, when the user uses the mobile device 170 to display a map and transmits the device's changing latitude/longitude in order to obtain and display the proper map tile. The user may be prompted by the mobile device 170 to confirm that the user desires to transmit his/her location to the server prior to the mobile device 170 transmitting the user's location to the alert server 110. In one embodiment, the user may opt-out of sharing his/her location with the alert server 110.

The user may further permit the alert server 110 to store a record of the locations that he/she visited, as well as the date and time of the visit. In one embodiment, the user may permit the alert server 110 to establish a weekly routine of the user. The weekly routine may include the geographic location of the user, the time at which the user was at the geographic location, and the duration of time the user spent at the geographic location. The user may also request that the alert server 110 purge the record of the locations that the user visited. The alert server 110 may also periodically purge the record of the locations that the user visited.

In establishing the weekly routine, the alert server 110 may formulate a spatial index, such as, but not limited to, one or more map tiles defining non-overlapping rectangular geographic regions. The one or more map tiles may represent the geographic locations where the user has stayed. Moreover, the alert server 110 may segment a period of time, such as one week, into a pre-defined number of time segments, such as 168 segments (7 days multiplied by 24 hours). By receiving location updates from the user during the time segments and correlating the location updates with the map tiles, the alert server 110 may generate a distribution map (e.g., a "heatmap") of the geographic locations where the user stayed at for each of the time segments. The alert server 110 may generate the distribution map over a predetermined period of time, such as eight weeks.

The alert server 110 may then assign a confidence value representing the likelihood that the user will be at a particular geographic location during one of the 168 time segments. The alert server 110 may determine the confidence value based on normalizing the ratio distribution of the aggregated time segments to the total time segments. Based on this normalization, the confidence value may fall within a range of confidence values, such as between 0 and 10,000. In this embodiment, the higher the confidence value, the more often the user stayed at the map tile at the corresponding time segment. From the distribution maps (e.g., the "heatmaps") and the determined confidence values, the alert server 110 may estimate whether the user is likely to appear at a particular geographic location at a particular time segment.

In another embodiment of storing a record of the locations a user has visited, the alert server 110 may maintain two different look-up tables. In this embodiment, a first table may facilitate the quick retrieval of locations based on a time-based factor. By way of example, the locations may be stored by the hour and by day of the week, such as the following Table 1 (hereafter, the "Time-keyed Table"):

TABLE 1

| Day of Week | Hour | List of Locations |
|---|---|---|
| Monday | 12:00 A.M. to 12:59 A.M. | (See Below) |
| Monday | 1:00 A.M. to 1:50 A.M. | |
| ... | | |
| Sunday | 11:00 P.M. to 11:59 A.M. | |

In that regard, a list of locations may be readily retrieved based on the day and hour of the week. The list of locations may comprise a list of any geographic locations that the user visited that hour on that day of the week. The locations may further be defined as geographic regions, such as 100 m×100 m squares that correspond with regions covered by detailed (e.g., relatively low-altitude and highly-zoomed) map tiles.

Moreover, the locations may be associated with a value based on the system's determination of the likelihood that the user will be at the particular location during the relevant time period (i.e., a "confidence value"). As discussed before, the confidence value may fall within a range of confidence values, such as between 0 and 10,000, where 10,000 represents the greatest likelihood that the user will be at the particular location and zero indicates that it is unlikely that the user will be at the location.

The confidence value may be calculated in accordance with a number of factors, including the frequency that the user has been to that location at that time period in the past. Thus, if a mobile device transmits locations indicating that the user goes to the same latitude/longitude every Monday through Friday for lunch between noon and 1:00 pm, and the latitude/longitude falls within the region associated with a tile identified by the tile identifier "20", then the day/hour table may indicate:

TABLE 2

| Day of Week | Hour | List of Locations |
|---|---|---|
| Monday | 12:00 P.M. to 12:59 P.M. | Region 20, Value 10000. |
| Tuesday | 12:00 P.M. to 12:59 P.M. | Region 20, Value 10000. |
| Wednesday | 12:00 P.M. to 12:59 P.M. | Region 20, Value 10000. |

However, if the server receives information indicating that the user visits three different locations in three different regions on Mondays during lunch time, and some locations more often than others, the server may store a list of locations as follows.

TABLE 3

| Day of Week | Hour | List of Locations |
|---|---|---|
| Monday | 12:00 P.M. to 12:59 P.M. | Region 20, Value 5000; Region 25, Value 3000; Region 23, Value 1000. |

In one embodiment, the number of locations for each time period may vary. The list of locations may be sorted by confidence value, such that the first location on the list is the most likely location of the user.

The system 100 may store another collection of information that pre-sorts the user's prior locations by region. For example, the alert server 110 may store a look-up table keyed by the same regions described above (hereafter, the "Region-keyed Table"). Each region, in turn, is associated with a list of time periods, such as the hours of days of the week. Each cell of the table may store the confidence value associated with that location at that time as follows:

TABLE 4

| | Monday 12:00 A.M. - 12:59 A.M. | Monday 1:00 A.M. - 1:59 A.M. | | Sunday 11:00 P.M. - 11:59 P.M. |
|---|---|---|---|---|
| Region | | | | |
| Region 20 | (Confidence Value) | (Confidence Value) | ... | (Confidence Value) |
| Region 21 | (Confidence Value) | (Confidence Value) | | (Confidence Value) |

TABLE 4-continued

| Region | Monday 12:00 A.M. - 12:59 A.M. | Monday 1:00 A.M. - 1:59 A.M. | ... | Sunday 11:00 P.M. - 11:59 P.M. |
|---|---|---|---|---|
| Region 22 | (Confidence Value) | (Confidence Value) | | (Confidence Value) |
| ... | (Confidence Value) | (Confidence Value) | | (Confidence Value) |

Continuing the example data described above, one or more of the values of the Region-Keyed Table may appear as follows:

TABLE 5

| Region | Monday 12:00 P.M. - 12:59 P.M. | Monday 1:00 P.M. - 1:59 P.M. |
|---|---|---|
| Region 20 | 5000 | 3000 |
| Region 23 | 1000 | 500 |
| Region 25 | 3000 | 1000 |

In one embodiment, the system 100 may base the confidence value on whether the client was stationary with the particular location. By way of example, the system 100 may have a greater degree of confidence that the user will return to a particular location in the future if the user previously spent a predetermine period of time or a particularly long time at the location. Thus, the confidence value associated with a particular location may be much greater if the user previously spent five hours at the location compared to 20 minutes.

The system 100 may also require that the user spend another predetermined period of time, such as a minimum amount of time, at a location before factoring the time/location into a confidence value. For example, if the user spent less than 5 minutes at the same location, the system 100 may not factor that time period or location into its calculation of a confidence value.

As noted above, a location may be defined variously, and the system 100 may use a different location reference system for determining whether a user is stationary than it uses to store the user's location history. By way of example, GPS receivers are not always accurate and may return different latitude/longitude within a certain tolerance even if the user did not move. In other words, the latitude/longitude returned by a receiver may be considered accurate within a certain distance, and that distance may be considered to define a circle around a given latitude/longitude location. In one embodiment, a user is considered to be stationary if the latitude/longitude locations returned by the GPS receiver falls within that circle.

In some circumstances, the system 100 may not be able to determine which particular region includes the user's location. By way of example, mobile device 170 may transmit a cell tower ID to alert server 110. If the cell tower's signal is strong enough to include multiple regions, the alert server 110 may not know the precise region in which the user is located.

In such an instance and in one embodiment, the system 100 may divide the highest confidence value among all of the regions in which the user may be located. Thus, if the particular cell tower covers 5 regions, the system may assign a confidence value of 2,000 (10,000 divided by 5) to each of the regions. In another aspect, because the system 100 knows that the user is certainly within one of the regions, it may assign the highest confidence value (e.g., 10,000) to all of the regions.

In some embodiments, the confidence value may change depending on how the user's location was determined. For example, if the user's location was determined based on the mobile device's 170 presence within the transmission range of a large cell tower, the alert server 110 may assign a smaller confidence value to that location than a location determined by a GPS receiver. In other embodiments, the components and methods used to determine the user's location will have no bearing on the confidence value.

The system and method may alert one user (the "alerted user") whenever another user (the "unusually-located user") is unexpectedly nearby. In at least one aspect, a user's location is used to determine and provide an alert with the user's permission, such as the user providing permission in advance. The system and method may request confirmation from the user that the user desires to share his or her location with others before the system sends a notification regarding the user's location.

By way of example, when the alert server 110 becomes aware of the location of device 170, it may determine whether the device is in an unusual location. A location may be determined to be an unusual location in various ways. In one embodiment, the server may identify the region in which the user is located and query the Region-Keyed Table for the confidence value based on the region and the then-present time. If the confidence value is lower than a threshold, e.g., the user may be 10% likely to be in the area based on prior history, the system 100 may determine that the user is in an unusual location.

In another embodiment, the alert server 110 may determine whether the user is in an unusual location based on the time at which the user is at a geographic location, such as where the user is at a geographic location outside of the temporal bounds in which the alert server 110 would expect the user to be at the geographic location. For example, where the distribution map of the user indicates that the user is at normally location A from 8:00 P.M. to 9:00 P.M., but the user appears at location A at 11:00 P.M., the alert server 110 may determine that the user is at an unusual location. Furthermore, as a user's normal routine may fluctuate on a day-to-day basis, the alert server 110 may insert a temporal fuzz factor, such as +/−one hour, into the determination of whether the user is at an unusual location. Thus, using the example above, were the user to appear at location A at 10:00 P.M. or at 7:00 P.M., the alert server 110 may refer to the temporal fuzz factor to determine that, in fact, the user is not at an usual location.

In determining whether the user is at an unusual location, the alert server 110 may also account for whether the user has provided an update as to the location of the user. For example, the alert server 110 may implement a stale location factor that represents whether the user has updated his/her location. The stale location factor may represent a predetermined period of time, such as one hour or one day. Where the user has not provided an update within the predetermined period of time, the alert server 110 may determine that the user's location is unknown until the user provides the next update as to the user's location.

The system 100 may also determine whether the unusually located user is proximate to another user. In one aspect, the alert server 110 may determine the location of any users associated with the unusually-located user, e.g., users that the unusually-located user identified as a "friend". In that regard, the system 100 may determine the geographic distance between the location of the first user's friends and the first user. If the distance is below a threshold distance, such as one mile, one or both of the users may be alerted.

Different types of messages may be sent to the user to alert him/her. By way of example, if a user's location is determined based on the user's mobile device, the user may be provided with a text message or called with a computer-generated audio message. In another embodiment, the users may be alerted via an e-mail or other electronic message. Moreover, the system 100 may alert one or more users, such as the unusually-located user, one or more users proximate to the unusually-located user, one or more friends of the unusually-located user, or combinations thereof. Furthermore, the system 100 may also select the user(s) to alert based on pre-defined user preferences.

As discussed above, a pre-defined threshold distance may be used to determine whether the unusually-located user is proximate to related users. In one embodiment, the pre-defined threshold distance may be dynamically determined based on information associated with information particular to the users. For example, the pre-defined threshold distance may be determined based on the location at which the unusually-located user is currently located, and the location at which the user is usually located (such as the location having the highest confidence for that particular day or time).

In that regard, the pre-defined threshold distance may be a function of the distance between those two locations; for example, the distance between the two locations divided by three. If the pre-defined threshold distance is calculated to be below or above a set maximum, the pre-defined threshold distance may be adjusted accordingly, e.g., below 1 mile or above 100 miles. Thus, if a user is usually located in Mountain View, Calif. at night but goes to San Francisco one evening (45 miles away), the system may alert all related users within 15 miles (45 miles divided by 3) of the user's then-current location. If the same user went to Toronto, the system may alert the user's friends within 667 miles (2000 miles divided by three), but capped at 100 miles.

In still another embodiment, the proximity may be based on the number of times that a user has been alerted to the unusually-located user. For example, each time a first user is alerted to a second user, the threshold distance may decrease (e.g., it may decrease 250 m each the two users are alerted to each other, or halved each time).

The system 100 may determine proximity according to one or more embodiments. For example, the system 100 may determine proximity based on the last time an alert was sent to the users. By way of example, after users are alerted to one another, the system 100 may wait a predetermined period of time, such as one day, before alerting the users to each other again. In yet another embodiment, proximity may be determined based on whether the two users are within the same geographic region or neighboring geographic regions as defined by the foregoing tables.

The system 100 may also determine proximity based on how popular the location is to the user. For example, if the user is often at a particular location, the system 100 may not consider it unusual for the user to stay beyond their usual time at the location. Thus, if the user is at home, the system 100 may expand the time and space used to look for other users, e.g., if a user usually stays at work between 8:00 A.M. and 6:00 P.M., and the user one day decides to stay at work until 7:30 P.M., the system 100 may review the entire history between 4:30 P.M. and 10:30 P.M. when calculating whether a user is at an unusual location at 7:30 P.M.

The system 100 may also suppress proximity under one or more conditions. For instance, if two users are determined to be travelling together, the system 100 may not alert one user to the other when they travel to an unusual location.

The system 100 may also use a combination of the foregoing factors, as well as other factors, to determine proximity. For instance, after two users are alerted to one another, the pre-defined threshold distance may decrease by half and the system 100 may delay alerting the users to each other again for a predetermined period of time, such as one day.

For reader clarification, one example of determining proximity is described below:

a) A first user, A, lives in San Francisco and is friends with a second user, B, who lives in New York City.

b) User A travels to New Jersey.

c) Let the friend-nearby-threshold be f (the distance-from-most-likely-location)/3, with a cap at 100 miles.

d) User A may then receive an alert that User A is 30 miles away from User B.

e) The friend-nearby-threshold may then be adjusted to be 30/3=10 miles.

f) User A may then move in New Jersey, but User A may not get closer than 10 miles to User B.

g) User A may then eventually go to New York City and receive an alert that User A is within 5 miles of User B.

h) The friend-nearby-threshold may then be adjusted to be 5/3=1.66 miles.

i) User A may then move in New York City, but User A may not get closer than 1.66 miles to User B.

j) No further alerts are triggered.

One of the advantages of the system for alerting users based on proximity is its ability to accommodate a wide variety of alternatives and additions to the foregoing features. For example, functions described above as being performed by the server may be performed by the client device, and vice versa. For example, the server may compute and transmit the client device's estimated location to the client device.

Figure 3:
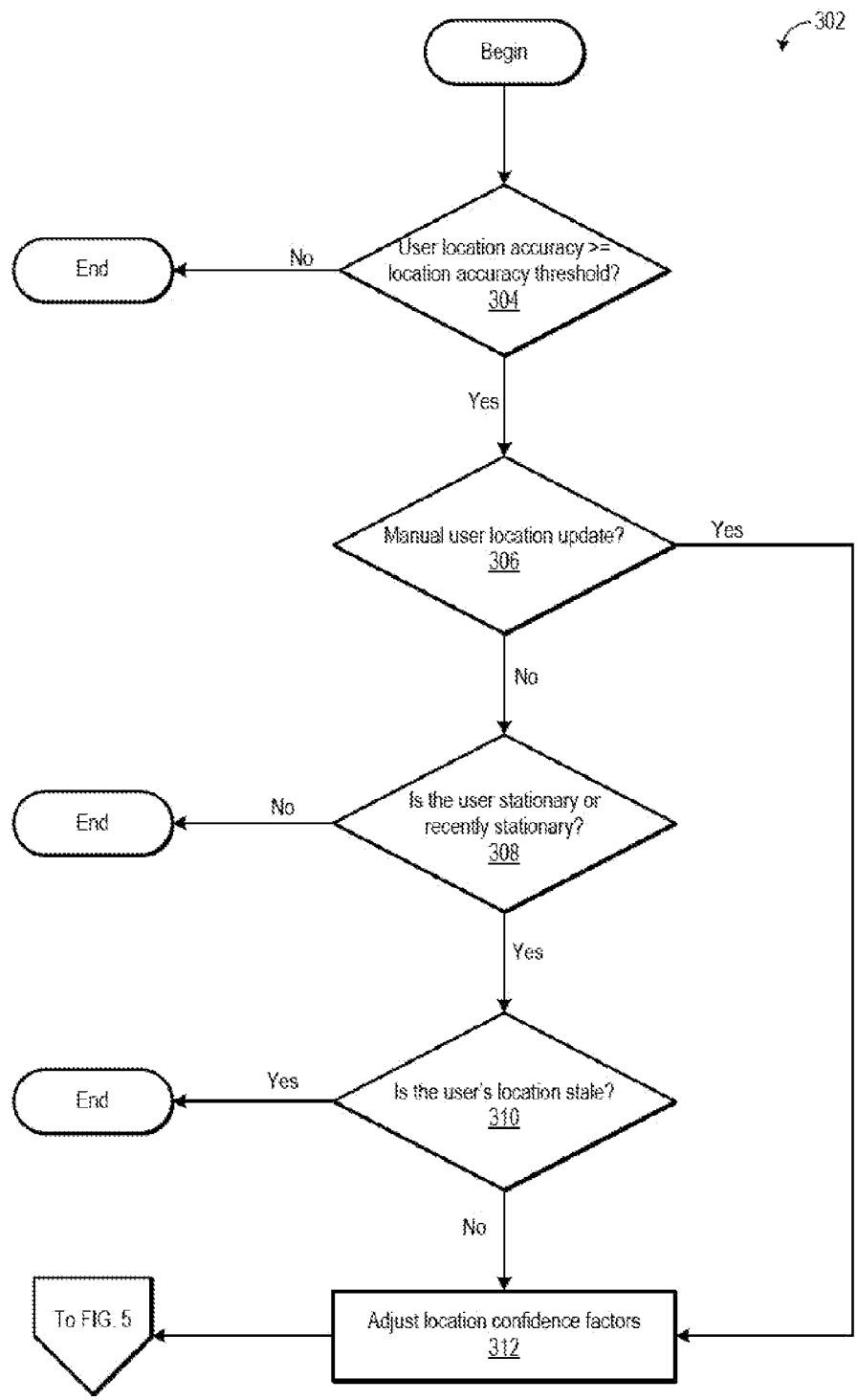
FIG. 3 is an illustration of one example of logic flow for alerting friends in proximity to a user's location in accordance with aspects of the invention.

Turning next to FIG. 3 is an illustration of one example of logic flow 302 for alerting friends in proximity to a user's location. Logic flow 302 assumes that the alert server 110 already has a geographic location history for a user. However, as discussed before, where the alert server 110 does not have a geographic location history, logic flow 302 may be extended in that instance to initially determine a geographic location history for the user and to assign one or more confidence values for the geographic locations of the geographic location history.

When the alert server 110 begins determining whether proximity users are to be alerted as to the user's location, the alert server 110 may initially determine whether a received current geographic location of the user is accurate enough (Block 304). Determining whether the received current geographic location is accurate enough may include comparing the accuracy of the received current geographic location with a location accuracy threshold. For example, the alert server 110 may determine that the received current geographic location is accurate within 5 meters, and the location accuracy threshold may require that the current geographic location be accurate within 3 meters. In this example, the alert server 110 may determine that the received current geographic location of the user is accurate enough to continue the logic flow 302. Otherwise, the alert server 110 may terminate the current instance of the logic flow 302 and may wait for another geographic location update from the user.

The alert server 110 may then query whether the received current geographic location was updated manually or automatically (Block 306). A manual user location update may indicate that the user desires other users to know of the user's location. Where the received current geographic location is a result of a manual user update, the alert server 110 may then proceed to adjust one or more location confidence factors used in determining whether the user is in an unusual location (e.g., a geographic location that is outside of the user's normal routine) (Block 312). However, in the instance where the alert server 110 determines that the received current geographic location is not the result of a manual update, the alert server 110 may perform additional determinations to ascertain whether the user is stationary, such that the alert server 110 does not inaccurately report the geographic location of the user should the user still be on the move.

In ascertaining whether the user is still on the move, the alert server 110 may first determine whether the user is, in fact, stationary or whether the user has recently moved from the received current geographic location (Block 308). As discussed above, the alert server 110 may use one or more techniques for determining whether the user is stationary. In one embodiment, the alert server 110 may consider the latitude/longitude transmitted by the user accurate within a certain distance, and that distance may be considered to define a circle around a given latitude/longitude location. In this embodiment, the alert server 110 may consider the user to be stationary if the latitude/longitude locations transmitted by the user falls within that circle.

The alert server 110 may then determine whether the received current geographic location is stale or, in other words, whether a predetermined time period has elapsed since the alert server 110 has received the current geographic location (Block 310). In one embodiment, the user may transmit a timestamp along with the current geographic location, and the alert server 110 may compare the received timestamp with a predetermine time period to determine whether the predetermined time period has elapsed. When the predetermined time period has elapsed, the alert server 110 may consider the received current geographic location stale and may wait terminate the logic flow 302 and wait for the user to transmit another current geographic location.

After determining that the user is stationary and that the received current geographic location is not stale or, in the instance where the user initiated a manual update of his/her geographic location, the alert server 110 may adjust one or more location confidence factors to account for subtle differences in the user's routine and/or accuracy in the received current geographic location (Block 312). The logic flow 302 of FIG. 3 continues onto FIG. 5 but, for clarity and continuity, a discussion of FIG. 4 follows.

Figure 4:
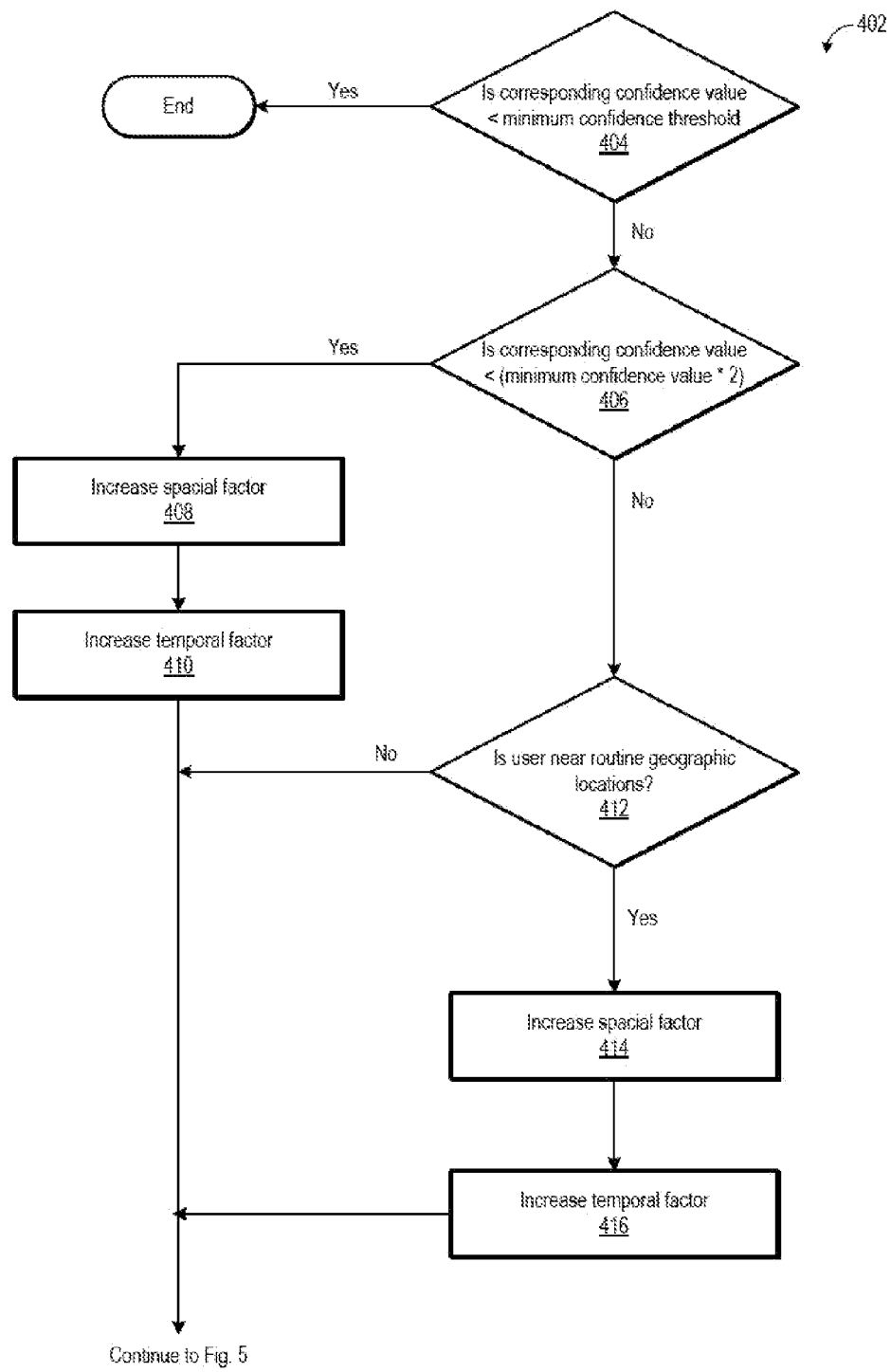
FIG. 4 is an illustration of one example of logic flow for adjusting confidence location factors used in determining a confidence value in accordance with aspects of the invention.

Referring to FIG. 4 is an illustration of one example of logic flow 402 for adjusting confidence location factors used in determining a confidence value. In adjusting confidence location factors, the alert server 110 may adjust a temporal factor and a spacial factor. The alert server 110 may adjust the temporal factor and/or the spacial factor in instances where the corresponding geographic location history of the user is deficient or where there may be gaps in the geographic location history.

Initially, the alert server 110 may retrieve or attempt to correlate a corresponding confidence value from the user's geographic location history based on the received current geographic location. The alert server 110 may then compare the retrieved confidence value with a minimum confidence threshold (Block 404). The minimum confidence threshold may be based on a comparison of the confidence values associated with the user's geographic location history. Moreover, the minimum confidence threshold may establish whether the retrieved confidence value signifies that the user is in a potentially unusual location or, in other words, that the user is outside of his or her routine.

The alert server 110 may then increase the minimum confidence threshold by a predetermined amount and then compare the retrieved confidence value with the increased minimum confidence threshold (Block 406). In one embodiment, the alert server 110 may increase the minimum confidence threshold by a factor of two.

In the instance where the alert server 110 determines that the retrieved confidence value is less than the increased minimum confidence threshold, the alert server 110 may adjust the spacial factor and/or temporal factor, such as by increasing the spacial factor (Block 408) and/or increasing the temporal factor (Block 410). The spacial factor may be increased by a predetermined amount of size, such as by 50%. The temporal factor may also be increased by a predetermined amount of time, such as by one hour. In alternative embodiments, the spacial factor and/or temporal factor may be both decreased, or one factor may be increased and the other factor may be decreased.

However, should the alert server 110 determine that the retrieved confidence value is not less than the increased minimum confidence threshold, the alert server 110 may then determine whether the user is near routine geographic locations, that is one or more geographic locations associated with relatively high confidence values (Block 412). Where the alert server 110 determines that the user is near one or more routine geographic locations, the alert server 110 may then increase the spacial factor (Block 414) and/or the temporal factor (Block 416). In one embodiment, the alert server may increase the spacial factor by a factor of two and may increase the temporal factor by a predetermined amount, such as by four hours, and/or may increase the spacial factor by a predetermined amount, such as by a factor of two. The logic flow may then continue to FIG. 5.

Figure 5:
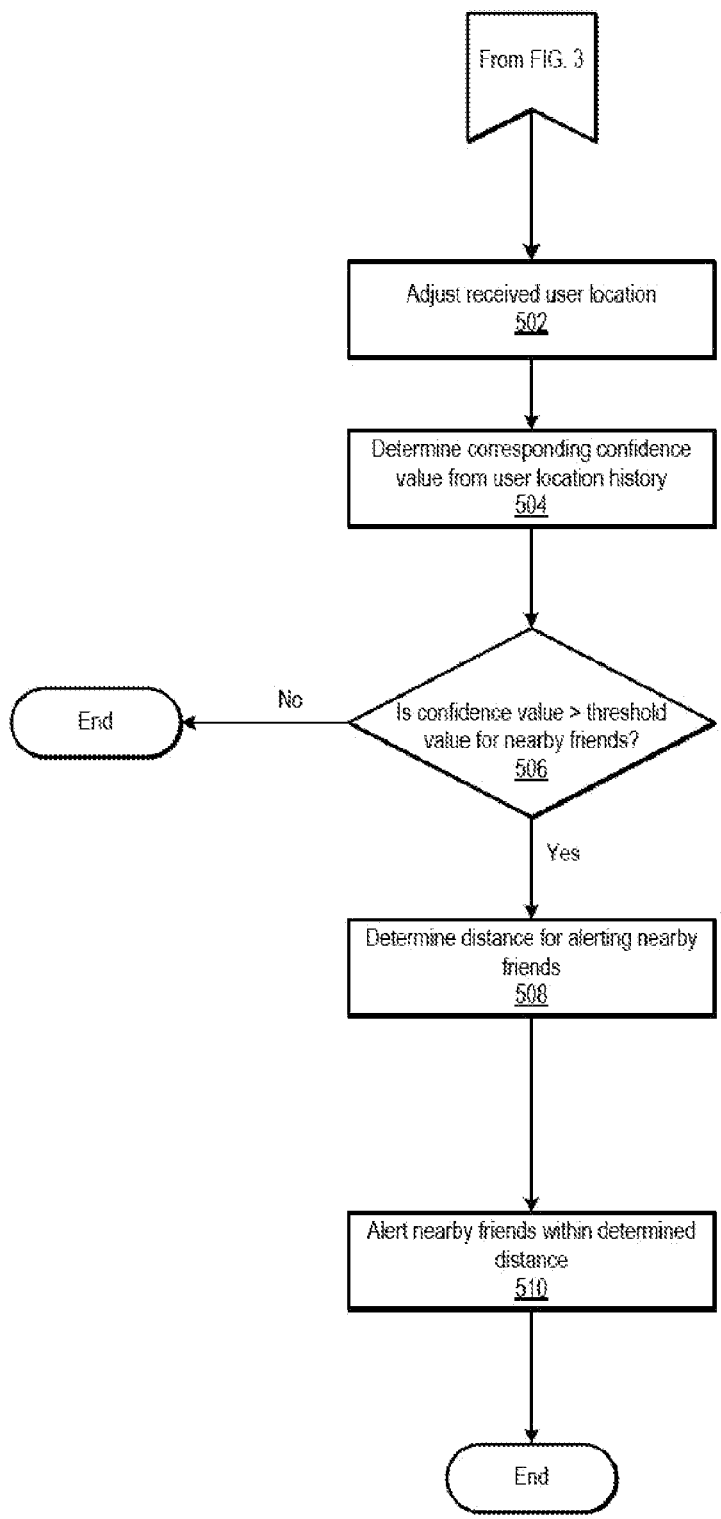
FIG. 5 is a continuation of the logic flow from FIG. 4 for alerting friends in proximity to a user's location in accordance with aspects of the invention.

FIG. 5 is a continuation of the logic flow from FIG. 4 for alerting friends in proximity to a user's location. After adjusting the spacial factor and/or the temporal factor, the alert server 110 may adjust the received current geographic location (Block 502). For example, increases in the spacial factor may increase the potential number of geographic locations in which the user may be located. Similarly, increases in the temporal factor may increase the number of time segments that the alert server 110 reviews to correlate the corresponding geographic locations and, ultimately, the corresponding confidence value.

The alert server 110 may then determine another corresponding confidence value for the geographic location adjusted based on the temporal factor and the spacial factor (Block 504). The alert server 110 may compare this corresponding confidence value with an alert threshold value (Block 506). The alert threshold value may represent the value at which the alert server 110 should transmit an alert to one or more friends of the user.

Where the corresponding confidence value is greater than the alert threshold value, the alert server 110 may then determine the distance for nearby friends for receiving an alert from the alert server 110 (Block 508). In one embodiment, the distance for determining whether one or more friends nearby is ⅓rd of either the distance to the user's routine area or the distance for the last triggered alert (if any), whichever distance is minimum. Moreover, the determined distance may be bounded by a minimum distance threshold and a maximum distance threshold.

Once the alert server 110 determines the distance for alerting nearby friends of the user's geographic location, the alert server 110 may then proceed to alert each of the friends within the determined distance (Block 510). However, the alert server 110 may account for additional considerations in deciding which friends of the user to alert. For example, the alert server 110 may consider whether the friend and the user have granted mutual access to the status of their geographic locations. The alert server 110 may also consider whether the friend's location is stale; if the friend's geographic location is stale, the alert server 110 may not alert the friend. In addition, the alert server 110 may consider whether the friend has been alerted previously and, if so, how much time has elapsed since the last time the friend was alerted. If the friend was alerted recently, the alert server 110 may decide not to alert the friend as to the user's geographic location. If alert server 110 may also consider combinations of these factors, or any other factor previously discussed in deciding whether to alert a friend to a user's geographic location.

In this manner, the alert server 110 provides automatic notifications to users regarding the geographic location of another user. Moreover, the alert server 110 attempts to prevent a constant stream of alerts from being sent to users. In addition, because the alert server 110 analyzes a user's geographic location history, the alert server 110 may determine whether the user is out of his or her routine and hence, the alerts that the alert server does send are potentially significant or meaningful. Accordingly, the alert server 110 described above provides a flexible and beneficial mechanism for alerting users as to the geographic location of another user.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible embodiments.

The invention claimed is:

1. An apparatus for alerting one or more users to the proximity of an unusually located user, the apparatus comprising:
    a memory operative to store a geographic location history for a first user, the geographic location history comprising a plurality of geographic locations, wherein each geographic location is associated with at least one time segment; and
    a processor in communication with the memory, the processor being operative to:
        determine a confidence value for each of the geographic locations of the plurality of geographic locations stored in the memory, wherein each confidence value for each of the geographic locations represents the likelihood of the first user being at the corresponding geographic location;
        receive a current geographic location of the first user;
        retrieve a corresponding confidence value for the received current geographic location of the first user;
        determine that the current geographic location of the user is unusual based on the comparison of the retrieved corresponding confidence value with a threshold confidence value; and
        transmit an alert to a second user in proximity to the first user when the processor determines that the current geographic location of the first user is unusual.

2. The apparatus of claim 1, wherein each of the geographic locations of the plurality of geographic locations were geographic locations in which the first user was relatively stationary.

3. The apparatus of claim 1, wherein at least one of the geographic locations of the plurality of geographic locations is a geographic location where the first user spent a predetermined amount of time being relatively stationary.

4. The apparatus of claim 1, wherein:
    the memory is further operative to organize the geographic location history according to at least one time-keyed table and at least one region-keyed table; and
    the processor is further operative to retrieve the corresponding confidence value with reference to the at least one time-keyed table or the at least one region-keyed table.

5. The apparatus of claim 1, wherein:
    the processor is further operative to distribute a selected one of the determined confidence values among a subset of the plurality of geographic locations when the processor determines that it is likely that the first user was at any one of the geographic locations of the subset of geographic locations.

6. The apparatus of claim 1, wherein the processor is further operative to determine that the current geographic location of the user is unusual when the retrieved corresponding confidence value is less than the threshold confidence value.

7. The apparatus of claim 1, wherein:
    the processor is operative to determine a selected one of the confidence values based on whether the corresponding geographic location of the selected one of the confidence values was determined according to one of two transmission modes; and
    the selected one of the confidence values is determined to be of a lesser value when the corresponding geographic location was determined based on the first transmission mode than where the corresponding geographic location was determined based on the second transmission mode.

8. The apparatus of claim 1, wherein the processor is further operative to determine that the first user is in proximity to the second user when the distance between the first user and the second user is less than a pre-defined threshold distance.

9. The apparatus of claim 8, wherein the processor is further operative to:
    decrease the pre-defined threshold distance when the alert is transmitted to the second user; and
    transmit another alert to the second user when proximity between the first user and the second user is less than the decreased pre-defined threshold distance.

10. The apparatus of claim 1, wherein the type of alert transmitted to the second user is based on how a geographic location of the second user is determined.

11. A method for alerting one or more users to the proximity of an unusually located user, the method comprising:
    storing, in a memory, a geographic location history for a first user, the geographic location history comprising a plurality of geographic locations, wherein each geographic location is associated with at least one time segment;
    determining, with a processor in communication with the memory, a confidence value for each of the geographic locations of the plurality of geographic locations stored in the memory, wherein each confidence value for each of the geographic locations represents the likelihood of the first user being at the corresponding geographic location;
    receiving a current geographic location of the first user;
    retrieving a corresponding confidence value for the received current geographic location of the first user;
    determining that the current geographic location of the user is unusual based on the comparison of the retrieved corresponding confidence value with a threshold confidence value; and transmitting an alert to a second user in proximity to the first user when the processor determines that the current geographic location of the first user is unusual.

12. The method of claim 11, wherein each of the geographic locations of the plurality of geographic locations were geographic locations in which the first user was relatively stationary.

13. The method of claim 11, wherein at least one of the geographic locations of the plurality of geographic locations is a geographic location where the first user spent a predetermined amount of time being relatively stationary.

14. The method of claim 11, further comprising:
organizing the geographic location history according to at least one time-keyed table and at least one region-keyed table; and
retrieving the corresponding confidence value with reference to the at least one time-keyed table or the at least one region-keyed table.

15. The method of claim 11, further comprising distributing a selected one of the determined confidence values among a subset of the plurality of geographic locations when the processor determines that it is likely that the first user was at any one of the geographic locations of the subset of geographic locations.

16. The method of claim 11, further comprising determining that the current geographic location of the user is unusual when the retrieved corresponding confidence value is less than the threshold confidence value.

17. The method of claim 11, further comprising determining a selected one of the confidence values based on whether the corresponding geographic location of the selected one of the confidence values was determined according to one of two transmission modes; and
wherein the selected one of the confidence values is determined to be of a lesser value when the corresponding geographic location of the selected confidence value was determined based on the first transmission mode than where the corresponding geographic location of the selected confidence value was determined based on the second transmission mode.

18. The method of claim 11, further comprising determining that the first user is in proximity to the second user when the distance between the first user and the second user is less than a pre-defined threshold distance.

19. The method of claim 18, further comprising:
decreasing the pre-defined threshold distance when the alert is transmitted to the second user; and
transmitting another alert to the second user when proximity between the first user and the second user is less than the decreased pre-defined threshold distance.

20. The method of claim 11, wherein the type of alert transmitted to the second user is based on how a geographic location of the second user is determined.

* * * * *